US012687433B2

(12) United States Patent
Lee et al.

(10) Patent No.: US 12,687,433 B2
(45) Date of Patent: Jul. 21, 2026

(54) CIRCULAR POLARIZER DETECTION DEVICE AND CIRCULAR POLARIZER DETECTION METHOD

(71) Applicants: National Central University, Taoyuan City (TW); USUN TECHNOLOGY CO., LTD, Taoyuan City (TW)

(72) Inventors: Ju-Yi Lee, Taipei City (TW); You-Jun Lin, Changhua City (TW); Wei-Chen Wong, New Taipei City (TW); Hsing-Hsien Tsai, Taoyuan City (TW)

(73) Assignees: National Central University, Taoyuan City (TW); USUN TECHNOLOGY CO., LTD, Taoyuan City (TW)

( * ) Notice: Subject to any disclaimer, the term of this patent is extended or adjusted under 35 U.S.C. 154(b) by 160 days.

(21) Appl. No.: 18/826,245

(22) Filed: Sep. 6, 2024

(65) Prior Publication Data

US 2025/0085165 A1 Mar. 13, 2025

(30) Foreign Application Priority Data

Sep. 8, 2023 (TW) ................................. 112134283

(51) Int. Cl.
| *G01J 4/04* | (2006.01) |
| *G01B 11/27* | (2006.01) |
| *G02B 5/30* | (2006.01) |

(52) U.S. Cl.
CPC .............. *G01J 4/04* (2013.01); *G01B 11/272* (2013.01); *G02B 5/3025* (2013.01); *G02B 5/3083* (2013.01)

(58) Field of Classification Search
CPC ....... G01J 4/04; G01B 11/272; G02B 5/3025; G02B 5/3083; G02B 27/286
See application file for complete search history.

(56) References Cited

U.S. PATENT DOCUMENTS

| 10,823,892 | B2 * | 11/2020 | Jo | ........................... G01M 11/02 |
| 2004/0008348 | A1 * | 1/2004 | Kishikawa | ............. G01N 21/23 |
| | | | | 356/364 |
| 2014/0152988 | A1 * | 6/2014 | Liu | .................... A61B 5/14558 |
| | | | | 356/364 |

FOREIGN PATENT DOCUMENTS

| TW | I808798 B | * | 7/2023 | ............. G01M 11/02 |

OTHER PUBLICATIONS

TW I808798 B—translation with page numbers (Year: 2023).*

* cited by examiner

*Primary Examiner* — Tarifur R Chowdhury
*Assistant Examiner* — Carlos Perez-Guzman

(57) ABSTRACT

A circular polarizer detection device for detecting a circular polarizer-to-be-detected including a first linear polarizer and a first wave plate is provided. The first linear polarizer has a first transmission axis, the first wave plate has a first fast axis, and there are a preset angle and an error angle between the first transmission axis and the first fast axis. The circular polarizer detection device includes a light source system, a second wave plate and an optical phase demodulation system. A first beam provided by the light source system is converted into a beam-to-be-detected through the circular polarizer-to-be-detected. The beam-to-be-detected enters the rotating second wave plate and then is converted into a second beam. The optical phase demodulation system receives the second beam, generates a phase difference curve, and analyzes a relationship between the rotation angle and the error angle. A circular polarizer detection method is also provided.

17 Claims, 9 Drawing Sheets

Rotation angle $\gamma$ of second wave plate

CIRCULAR POLARIZER DETECTION DEVICE AND CIRCULAR POLARIZER DETECTION METHOD

FIELD OF THE INVENTION

The invention relates to a detection device and a detection method, and in particular, to a circular polarizer detection device and a circular polarizer detection method.

BACKGROUND OF THE INVENTION

A polarization element is an optical element for changing a polarization state of light waves and has a wide range of applications in life and industry, such as polarized sunglasses and 3D glasses. A circular polarizer in the polarization element is mostly used for changing incident light into a circularly polarized light, in which an ellipticity of the circularly polarized light is one of the specifications of the circular polarizer. Factors affecting the ellipticity of the circularly polarized light include an included angle between a transmission axis of a linear polarizer and a fast axis of a wave plate in the circular polarizer. Therefore, the accuracy degree of alignment in the process of attaching the linear polarizer to the wave plate will affect the effect of the ellipticity of the circularly polarized light. However, it is known that the detection performance of the ellipticity of the circularly polarized light of the circular polarizer is not outstanding.

SUMMARY OF THE INVENTION

The invention provides a circular polarizer detection device and a circular polarizer detection method, which can accurately detect the circular polarizer.

The circular polarizer detection device provided by the invention is applicable to detecting a circular polarizer-to-be-detected. The circular polarizer-to-be-detected includes a first linear polarizer and a first wave plate. The first wave plate is disposed on one side of the first linear polarizer. The first linear polarizer has a first transmission axis. The first wave plate has a first fast axis. There are a preset angle and an error angle between the first transmission axis and the first fast axis. The circular polarizer detection device includes a light source system, a second wave plate, and an optical phase demodulation system. The light source system is disposed on one side of the circular polarizer-to-be-detected. The first linear polarizer is between the light source system and the first wave plate. The light source system provides a first beam to the circular polarizer-to-be-detected. The first beam is converted into a beam-to-be-detected through the circular polarizer-to-be-detected. The second wave plate is disposed on a side of the circular polarizer-to-be-detected away from the light source system. The second wave plate is suitable for rotating. The beam-to-be-detected enters the rotating second wave plate and is converted into a second beam through the second wave plate. The second wave plate has a second fast axis. There is a variable rotation angle γ between the second fast axis and the first transmission axis of the first linear polarizer. The second beam has a different phase difference as the rotation angle γ varies. The optical phase demodulation system is disposed on a side of the second wave plate away from the circular polarizer-to-be-detected. The optical phase demodulation system receives the second beam, generates a phase difference curve, and analyzes a relationship between the rotation angle γ and the error angle through the phase difference curve.

In an embodiment of the invention, the foregoing second wave plate is a quarter-wave plate.

In an embodiment of the invention, the foregoing circular polarizer detection device further includes a motor that is electrically connected to the second wave plate and drives the second wave plate to rotate.

In an embodiment of the invention, the foregoing preset angle is 45 degrees.

In an embodiment of the invention, the foregoing optical phase demodulation system includes a third wave plate and a photographing element, and the third wave plate is disposed between the second wave plate and the photographing element.

In an embodiment of the invention, the foregoing photographing element is a polarization camera.

In an embodiment of the invention, the foregoing third wave plate is a quarter-wave plate.

In an embodiment of the invention, the foregoing third wave plate has a third fast axis, and an included angle between the third fast axis and the first transmission axis of the first linear polarizer is 45 degrees.

In an embodiment of the invention, the foregoing light source system includes a laser light source, a second linear polarizer, and a circular polarizer, the second linear polarizer is disposed between the laser light source and the circular polarizer, and the laser light source provides a laser beam to sequentially pass through the second linear polarizer and the circular polarizer and then form the first beam.

In an embodiment of the invention, the foregoing first beam is a circularly polarized light.

In an embodiment of the invention, the foregoing optical phase demodulation system parses the rotation angle $\gamma_0$ corresponding to a maximum slope of the phase difference curve and calculates the error angle $\alpha$ through an operational formula, and the operational formula is $$\gamma_0 = \alpha + \frac{3}{4}\pi.$$

The invention additionally provides a circular polarizer detection method. The circular polarizer detection method includes providing a light source system, disposed on one side of the circular polarizer-to-be-detected, the first linear polarizer being between the light source system and the first wave plate, the light source system providing a first beam to the circular polarizer-to-be-detected, and the first beam being converted into a beam-to-be-detected through the circular polarizer-to-be-detected; disposing a second wave plate on a side of the circular polarizer-to-be-detected away from the light source system, the second wave plate being suitable for rotating, the beam-to-be-detected entering the rotating second wave plate and being converted into a second beam through the second wave plate, the second wave plate having a second fast axis, there being a variable rotation angle γ between the second fast axis and the first transmission axis of the first linear polarizer, and the second beam having a different phase difference as the rotation angle γ varies; and disposing an optical phase demodulation system on a side of the second wave plate away from the circular polarizer-to-be-detected to receive the second beam and generate a phase difference curve, the optical phase demodulation system parsing the rotation angle $\gamma_0$ corresponding to a maximum slope of the phase difference curve and calculating the error angle through the rotation angle $\gamma_0$ corresponding to the maximum slope of the phase difference curve and according to an operational formula.

In an embodiment of the invention, the foregoing operational formula for calculating the rotation angle $\gamma_0$ corresponding to the maximum slope of the phase difference curve and the error angle $\alpha$ is $$\gamma_0 = \alpha + \frac{3}{4}\pi.$$

In an embodiment of the invention, the foregoing optical phase demodulation system analyzes a light intensity signal of the second beam to convert the same into the phase difference curve.

In an embodiment of the invention, the foregoing optical phase demodulation system divides the light intensity signal of the second beam into light intensity signals at a plurality of linear polarization angles, the light intensity signals at the plurality of linear polarization angles are sequentially subjected to spatial filtering processing and low-pass filtering processing and then converted into the phase difference curve.

In an embodiment of the invention, the foregoing optical phase demodulation system includes a third wave plate and a photographing element, and the third wave plate is disposed between the second wave plate and the photographing element.

In an embodiment of the invention, the foregoing photographing element is a polarization camera.

The circular polarizer detection device and circular polarizer detection method according to the embodiments of the invention adopt the second wave plate suitable for rotating to change a phase difference of light-to-be-detected exiting from the circular polarizer-to-be-detected, and thus can accurately detect the circular polarizer.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1A:
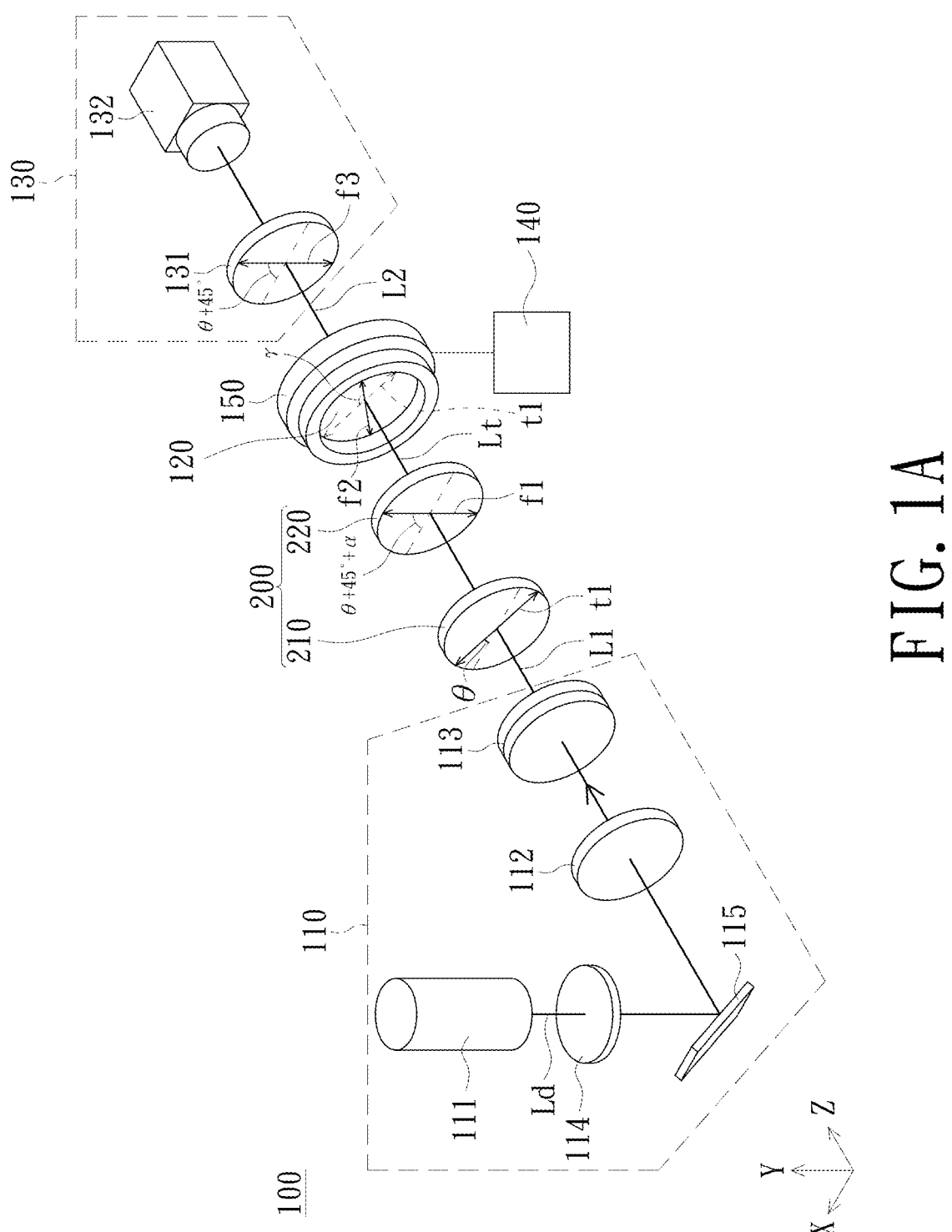
FIG. 1A is a schematic configuration diagram of a circular polarizer detection device according to an embodiment of the invention.
Figure 1B:
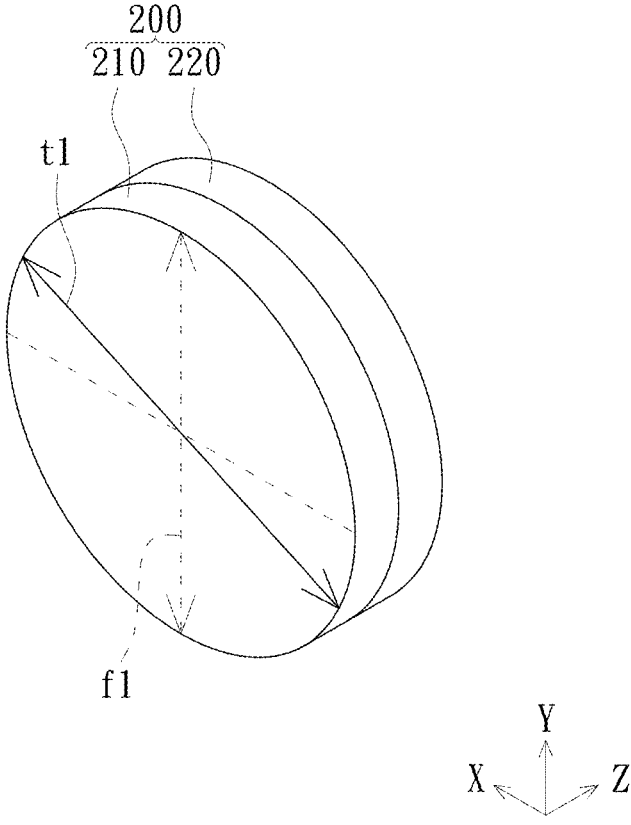
FIG. 1B is a schematic structural diagram of a circular polarizer-to-be-detected according to an embodiment of the invention.

FIG. 1A is a schematic configuration diagram of a circular polarizer detection device according to an embodiment of the invention. FIG. 1B is a schematic structural diagram of a circular polarizer-to-be-detected according to an embodiment of the invention. A circular polarizer detection device 100 provided by the invention is applicable to detecting a circular polarizer-to-be-detected 200. The circular polarizer-to-be-detected 200 includes a first linear polarizer 210 and a first wave plate 220. The first wave plate 220 is disposed on one side of the first linear polarizer. The first linear polarizer 210 has a first transmission axis t1. The first wave plate 220 has a first fast axis f1. There are a preset angle and an error angle $\alpha$ between the first transmission axis t1 and the first fast axis f1. The preset angle is for example 45°. Specifically, as shown in FIG. 1B, the first linear polarizer 210 and the first wave plate 220 of the circular polarizer-to-be-detected 200 are for example attached together. For ease of explanation, the first linear polarizer 210 and the first wave plate 220 are separated in FIG. 1A. In an embodiment, for example, a +x direction is defined as 0°, an angle between the first transmission axis t1 of the first linear polarizer 210 and the +x direction is, for example, 0, an angle between the first fast axis f1 of the first wave plate 220 and the first transmission axis t1 is 45°+$\alpha$, and an angle between the first fast axis f1 of the first wave plate 220 and the +x direction is for example $\theta$+45°+$\alpha$, where when $\theta$ is for example 0°, i.e., when the first transmission axis t1 is for example aligned with the +x direction, an angle between the first fast axis f1 of the first wave plate 220 and the +x direction is for example 45°+$\alpha$. It is to be illustrated that the angles (e.g., the included angle between the first transmission axis t1 and the +x direction) mentioned above are azimuth angles, and angles mentioned subsequently are also azimuth angles.

The circular polarizer detection device 100 according to an embodiment of the invention includes a light source system 110, a second wave plate 120, and an optical phase demodulation system 130. The light source system 110 is disposed on one side of the circular polarizer-to-be-detected 200. The first linear polarizer 210 is between the light source system 110 and the first wave plate 220. The light source system 110 provides a first beam L1 to the circular polarizer-to-be-detected 200. The first beam L1 is converted into a beam-to-be-detected Lt through the circular polarizer-to-be-detected 200. The second wave plate 120 is disposed on a side of the circular polarizer-to-be-detected 200 away from the light source system 110. The second wave plate 120 is suitable for rotating. The beam-to-be-detected Lt enters the rotating second wave plate 120 and is converted into a second beam L2 through the second wave plate 120. The second wave plate 120 has a second fast axis f2. There is a variable rotation angle γ between the second fast axis f2 and the first transmission axis t1 of the first linear polarizer 210. The second beam L2 has a different phase difference as the rotation angle γ varies. The optical phase demodulation system 130 is disposed on a side of the second wave plate 120 away from the circular polarizer-to-be-detected 200. The optical phase demodulation system 130 receives the second beam L2 and generates a phase difference curve, and parses a relationship between the rotation angle γ and the error angle α through the phase difference curve. The optical phase demodulation system 130 parses the rotation angle $\gamma_0$ corresponding to a maximum slope of the phase difference curve and calculates the error angle α through the rotation angle $\gamma_0$ corresponding to the maximum slope of the phase difference curve and according to an operational formula.

Specifically, the light source system 110 of the circular polarizer detection device 100 according to an embodiment of the invention for example includes a laser light source 111, a second linear polarizer 112, and a circular polarizer 113. The second linear polarizer 112 is for example disposed between the laser light source 111 and the circular polarizer 113. The laser light source 111 provides a laser beam Ld for example sequentially pass through the second linear polarizer 112 and the circular polarizer 113 and then form the first beam L1. The first beam L1 is for example a circularly polarized light, which may be conducive to reducing a detection error caused by a placement angle of the circular polarizer-to-be-detected 200, but it is not specifically limited in the invention. On the other hand, the light source system 110 for example further includes an aperture 114 and a reflector 115. The aperture 114 is for example disposed between the laser light source 111 and the reflector 115. The second linear polarizer 112 is for example disposed between the reflector 115 and the circular polarizer 113. The aperture 114 may filter the laser beam Ld into a relatively clean point light source and align the same with the reflector 115. In an embodiment, the laser light source 111 may be for example helium-neon laser, and the circular polarizer 113 is for example a standard circular polarizer, so that the first beam L1 formed after passing through the circular polarizer 113 is a circularly polarized light, but the invention is not limited thereto.

Following the above, the circular polarizer is composed of a linear polarizer and a quarter-wave plate. When a polarized light $E_i$ enters the circular polarizer and the polarized light enters from one side of the linear polarizer of the circular polarizer, with an included angle between a transmission axis of the linear polarizer and a +x direction being θ and an included angle between a fast axis of the quarter-wave plate and the transmission axis of the linear polarizer being α, a Jones vector of emergent light $E_0$ may be represented as:

$$E_0 = Q(\theta + \alpha)P(\theta)E_i = \tag{1}$$

$$\begin{bmatrix} i + \cos2(\theta + \alpha) & \sin2(\theta + \alpha) \\ \sin2(\theta + \alpha) & i - \cos2(\theta + \alpha) \end{bmatrix} \begin{bmatrix} \cos^2\theta & \sin\theta\cos\theta \\ \sin\theta\cos\theta & \sin^2\theta \end{bmatrix}$$

$$E_i = \begin{bmatrix} \cos(\theta + 2\alpha) + i\cos\theta \\ \sin(\theta + 2\alpha) + i\sin\theta \end{bmatrix} = A \begin{bmatrix} e^{i\emptyset_s} \\ e^{i\emptyset_p} \end{bmatrix}$$

Where A is an amplitude, and $\emptyset_s$ and $\emptyset_p$ represent phases of s-polarized light and p-polarized light respectively:

$$\emptyset_s = \arctan\frac{\cos\theta}{\cos(\theta + 2\alpha)} \tag{2}$$

$$\emptyset_p = \arctan\frac{\sin\theta}{\sin(\theta + 2\alpha)} \tag{3}$$

When the included angle α between the transmission axis of the linear polarizer and the fast axis of the quarter-wave plate is exactly ±45°, $\emptyset_s$ and $\emptyset_p$ are respectively:

$$\alpha = 45°: \emptyset_s = \theta + 90°, \emptyset_p = \theta \tag{4}$$

$$\alpha = -45°: \emptyset_s = 90° - \theta, \emptyset_p = 180° - \theta \tag{5}$$

As can be seen from Formula 4 and Formula 5, when α=±45°, a phase difference between the s-polarized light and the p-polarized light $\emptyset_p - \emptyset_s = \pm90°$, at which time, the Jones vector of the polarized light $E_0$ passing through the circular polarizer is:

$$\begin{bmatrix} e^{i\emptyset_s} \\ e^{i\emptyset_p} \end{bmatrix} = e^{i\emptyset_s} \begin{bmatrix} 1 \\ e^{i(\emptyset_p - \emptyset_s)} \end{bmatrix} = e^{i\emptyset_s} \begin{bmatrix} 1 \\ e^{\pm i\frac{\pi}{2}} \end{bmatrix} = e^{i\emptyset_s} \begin{bmatrix} 1 \\ \pm i \end{bmatrix} \tag{6}$$

As can be seen from the Jones vector in Formula 6, when the included angle between the transmission axis of the linear polarizer and the fast axis of the quarter-wave plate is +45°, the passing polarized light may be converted into a circularly polarized light, and the linear polarizer and the quarter-wave plate under this condition are attached to obtain a finished product, i.e., the circular polarizer.

Specifically, the second wave plate 120 of the circular polarizer detection device 100 according to an embodiment of the invention is for example the quarter-wave plate. It is to be illustrated that a phase delay amount caused by the quarter-wave plate is π/4, and a phase delay amount caused by a half-wave plate is π/2. Therefore, a phase delay effect of one half-wave plate may be achieved by using two quarter-wave plates. Assuming that a linearly polarized light $E_i$ with an angle θ included between its polarization direction and the +x direction passes through the half-wave plate HWP(γ) with an angle γ included between its fast axis and the +x direction, the Jones vector of the emergent light $E_0$ is:

$$E_0 = HWP(\gamma)E_i = \begin{bmatrix} \cos2\gamma & \sin2\gamma \\ \sin2\gamma & -\cos2\gamma \end{bmatrix} \begin{bmatrix} \cos\theta \\ \sin\theta \end{bmatrix} = \tag{7}$$

$$\begin{bmatrix} \cos(2\gamma - \theta) \\ \sin(2\gamma - \theta) \end{bmatrix} = \begin{bmatrix} \sqrt{\cos^2(2\gamma - \theta)} \, e^{i\emptyset_s} \\ \sqrt{\sin^2(2\gamma - \theta)} \, e^{i\emptyset_p} \end{bmatrix}$$

Where $\emptyset_s$ and $\emptyset_p$ represent the phases of the s-polarized light and the p-polarized light respectively:

$$\emptyset_s = \arctan\frac{0}{\cos(2\gamma - \theta)} \tag{8}$$

$$\emptyset_p = \arctan\frac{0}{\sin(2\gamma - \theta)} \tag{9}$$

Figure 2:
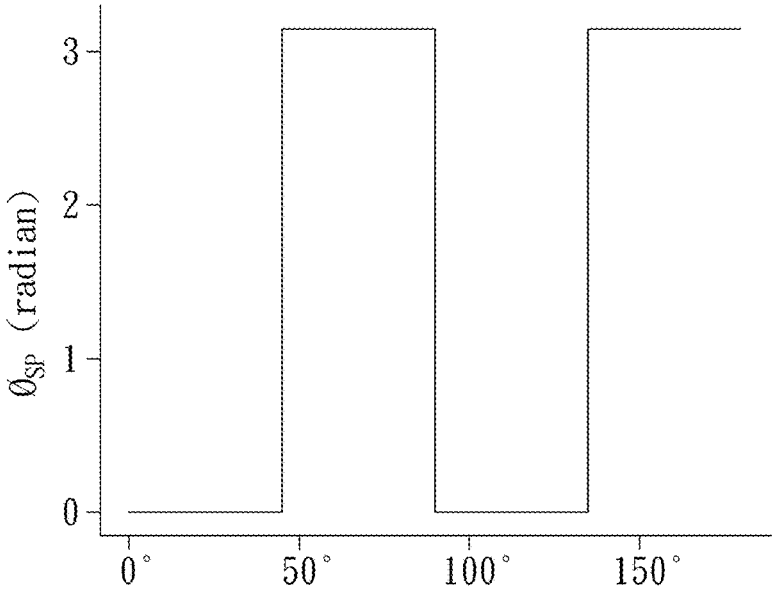
FIG. 2 is a schematic simulated diagram of a relationship between a fast axis angle of a half-wave plate and a phase difference according to an embodiment of the invention.

The phases $\emptyset_s$ and $\emptyset_p$ will remain constant values until the plus-minus sign conversion of $\cos(2\gamma - \theta)$ in Formula 8 or $\sin(2\gamma - \theta)$ in Formula 9 occurs, and $\emptyset_s$ and $\emptyset_p$ produce a change of $\pi$ or $-\pi$. If a polarization direction $\theta$ of incident light is fixed and a fast axis direction $\gamma$ of the half-wave plate is rotated, a phase difference $\emptyset_p-\emptyset_s$ introduced by rotation of the half-wave plate is shown in FIG. 2. FIG. 2 is a schematic simulated diagram of a relationship between a fast axis angle of a half-wave plate and a phase difference according to an embodiment of the invention. As can be seen from FIG. 2, the phase difference introduced during rotation of the half-wave plate has only two values of 0 and $\pi$, when the phase difference changes, a phase difference curve will be faulted, which may be regarded as the phase difference curve having an infinite slope and occurs when the fast axis of the half-wave plate is rotated to a specific angle. The foregoing characteristic that when the fast axis of the half-wave plate is rotated to the specific angle, the phase difference curve will change dramatically, and a maximum slope appears may be utilized for high-precision angle positioning.

Therefore, as previously mentioned, since two quarter-wave plates may achieve the phase delay effect of one half-wave plate, the circular polarizer detection device 100 according to an embodiment of the invention utilizes the foregoing characteristic that the phase difference dramatically changes when the two quarter-wave plates are rotated to a specific angle. That is, the second wave plate 120, which is for example a quarter-wave plate, is used to be matched with the first wave plate 220 included in the circular polarizer-to-be-detected 200, where the first wave plate 220 is also a quarter-wave plate. For example, the first beam L1 sequentially passes through the circular polarizer-to-be-detected 200 and the second wave plate 120 and then forms the second beam L2, where the second beam L2 is based on Jones calculus, and a Jones vector of the second beam L2 is shown in Formula 10 below:

$$E_0 = Q(\gamma)Q\left(\theta + \frac{\pi}{4} + \alpha\right)P(\theta)E_i = \quad (10)$$

$$\begin{bmatrix} i+\cos 2\gamma & \sin 2\gamma \\ \sin 2\gamma & i-\cos 2\gamma \end{bmatrix}\begin{bmatrix} i-\sin 2(\theta+\alpha) & \cos 2(\theta+\alpha) \\ \cos 2(\theta+\alpha) & i+\sin(\theta+\alpha) \end{bmatrix}$$

$$\begin{bmatrix} \cos^2\theta & \sin\theta\cos\theta \\ \sin\theta\cos\theta & \sin^2\theta \end{bmatrix}E_i =$$

$$\begin{bmatrix} \sin(2\gamma-2\alpha-\theta)-\cos\theta+i(\cos(2\gamma-\theta)-\sin(2\alpha+\theta)) \\ -\cos(2\gamma-2\alpha-\theta)-\sin\theta+i(\sin(2\gamma-\theta)+\cos(2\alpha+\theta)) \end{bmatrix} = \begin{bmatrix} Ae^{i\emptyset_s} \\ Be^{i\emptyset_p} \end{bmatrix}$$

Where A and B are electric field amplitudes of the s-polarized light and the p-polarized light respectively. The Jones vector of the second beam L2 may be written into a form of an exponential function through Euler Formula, where $\emptyset_s$ and $\emptyset_p$ represent the phases of the s-polarized light and the p-polarized light respectively:

$$\emptyset_s = \arctan\frac{\cos(2\gamma-\theta)-\sin(2\alpha+\theta)}{\sin(2\gamma-2\alpha-\theta)-\cos\theta} \quad (11)$$

$$\emptyset_p = \arctan\frac{\sin(2\gamma-\theta)+\cos(2\alpha+\theta)}{-\cos(2\gamma-2\alpha-\theta)-\sin\theta} \quad (12)$$

It can be obtained from Formula 11 and Formula 12 that the phase difference $\emptyset_{sp}$ of the s-polarized light and the p-polarized light is shown in Formula 13 below:

$$\emptyset_{sp} = \quad (13)$$

-continued
$$\arctan\frac{\sin(2\gamma-\theta)+\cos(2\alpha+\theta)}{-\cos(2\gamma-2\alpha-\theta)-\sin\theta} - \arctan\frac{\cos(2\gamma-\theta)-\sin(2\alpha+\theta)}{\sin(2\gamma-2\alpha-\theta)-\cos\theta}$$

Figure 3:
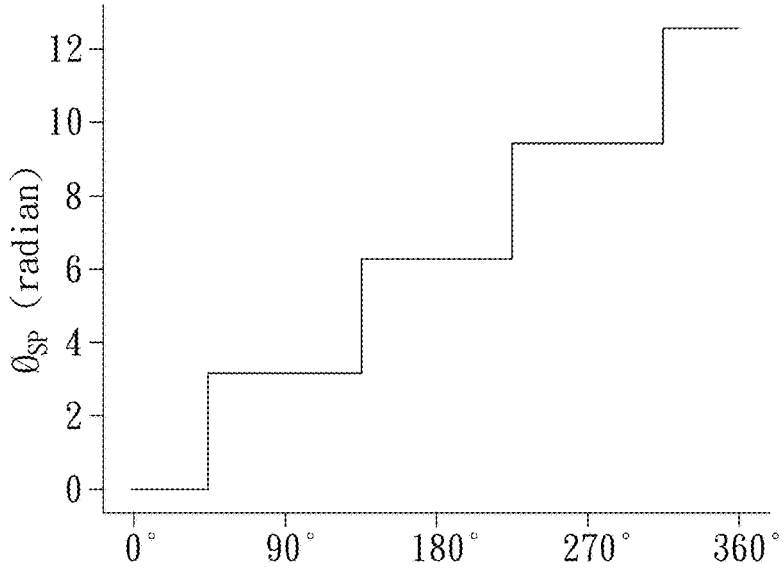
FIG. 3 is a schematic simulated diagram of a relationship between a rotation angle $\gamma$ of a second wave plate and a phase difference according to an embodiment of the invention.

When the second wave plate 120 is rotated to change the rotation angle $\gamma$, the phase difference curve $\emptyset_{sp}(\gamma)$ may be obtained. Formula 3 is simulated by Python program. When $\theta=0°$, $\alpha=0°$, the rotation angle $\gamma$ changes from 0° to 360°, and the phase difference curve may be obtained, as shown in FIG. 3. FIG. 3 is a schematic simulated diagram of a relationship between a rotation angle $\gamma$ of a second wave plate and a phase difference according to an embodiment of the invention. As can be seen from FIG. 3, when the second wave plate 120 is rotated, the phase difference is faulted at the instant of each 90° rotation of the rotation angle $\gamma$, and as shown in FIG. 3, there are four faults.

In order to obtain a relationship between the error angle $\alpha$ and the rotation angle $\gamma$, 0-0° is substituted into Formula 13, and the phase difference $\emptyset_{sp}$ is shown in Formula 14 below:

$$\emptyset_{sp} = \emptyset_p - \emptyset_s = \arctan\frac{\sin(2\gamma)+\cos(2\alpha)}{-\cos(2\gamma-2\alpha)} - \arctan\frac{\cos(2\gamma)-\sin(2\alpha)}{\sin(2\gamma-2\alpha)-1} \quad (14)$$

As can be seen from Formula 11 to Formula 14, both $\emptyset_s$ and $\emptyset_p$ are arc tangent functions. When both a numerator and a denominator of each arc tangent function are zero, there is no solution, and the arc tangent function is not continuous at this point. Therefore, when one of $\emptyset_s$ and $\emptyset_p$ is $$\arctan\frac{0}{0},$$

the phase difference curve will be faulted because there is no solution, and thus through the rotation angle $\gamma$ corresponding to the fault of the phase difference curve at this time, the relationship between the rotation angle $\gamma$ and the error angle $\alpha$ may be obtained. In the embodiment, for example, $$\arctan\frac{0}{0}$$

may be obtained by respectively substituting rotation angles $\gamma$ corresponding to faults of the phase difference curve between 90° and 180° as well as between 270° and 360° into Formula 14. Let both the numerators and the denominators of the arc tangent functions be zero, and after operating, a conditional formula may be obtained:

$$\gamma_0 - \alpha = \left(n-\frac{1}{4}\right)\pi, n \in Z \quad (15)$$

Where an angle $\gamma_0$ is an angle of the second fast axis f2 of the second wave plate 120 when the phase difference function formula Sp has no solution. That is, the rotation angle $\gamma_0$ is an angle of the second fast axis f2 corresponding to the maximum slope of the phase difference curve. As can be seen from Formula 15, a period during which the arc tangent functions in the phase difference $\phi_{sp}$ have no solutions is R. By limiting the rotation angle $\gamma$ of the second wave plate 120 to be 0 to $\pi$ and $\gamma-\alpha>0$, a relationship formula between the angle $\gamma_0$ and the error angle $\alpha$ may be obtained.

$$\gamma_0 = \alpha + \frac{3}{4}\pi \qquad (16)$$

Figure 4:
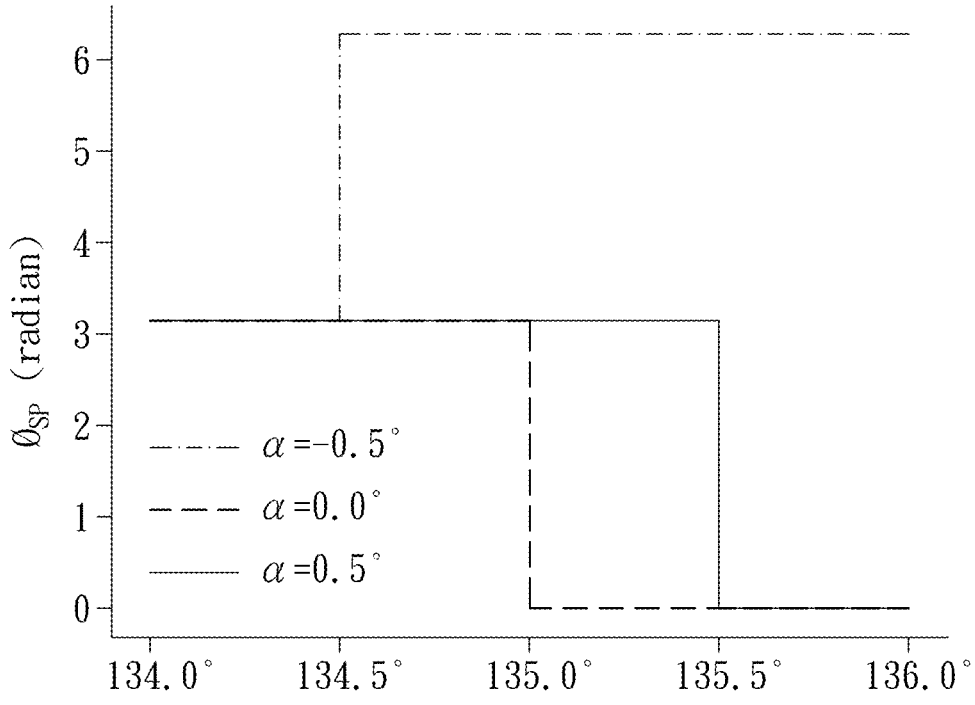
FIG. 4 is a schematic simulated diagram of a relationship between a rotation angle $\gamma$ of a second wave plate and a phase difference corresponding to different error angles $\alpha$ according to an embodiment of the invention.

$\theta=0°$ and $\alpha=-0.5°$, $0°$ and $0.5°$ are substituted into Formula 14, the rotation angle $\gamma$ changes from $134°$ to $136°$, and through simulation of Python program, a phase difference curve shown in FIG. 4 may be obtained. FIG. 4 is a schematic simulated diagram of a relationship between a rotation angle $\gamma$ of a second wave plate and a phase difference corresponding to different error angles $\alpha$ according to an embodiment of the invention. A distribution range of phase difference values of $\alpha=-0.5°$ is different from that of $\alpha=0°$ and $0.5°$, because the mutual relationship between $\varnothing_s$ and $\varnothing_p$ changes with $\gamma=135°$ as a boundary, which does not affect detection. The rotation angle $\gamma_0$ of the second fast axis f2 of the second wave plate 120 corresponding to the fault of the phase difference curve in the figure is offset as the error angle $\alpha$ changes, and an offset amount is equal to the error angle $\alpha$, which is consistent with calculation results of Formula 16. As such, if the phase difference curve is regarded as having an infinite slope at the fault, the rotation angle $\gamma_0$ may be defined as the angle corresponding to the second fast axis f2 of the second wave plate 120 corresponding to the maximum slope value of the phase difference curve.

According to the above, the circular polarizer detection device 100 according to an embodiment of the invention uses the rotating second wave plate 120 to generate the phase difference curve, after finding the rotation angle $\gamma_0$ of the second fast axis f2 of the second wave plate 120 corresponding to the maximum slope value of the phase difference curve, the error angle $\alpha$ of the circular polarizer-to-be-detected 200 may be calculated through the operational formula, Formula 16.

Additionally, it is to be noted that considering observing the change in phase difference $\varnothing_{sp}$ caused by the angle $\theta$ when the angle $\theta$ is not exactly $0°$, that is, the first transmission axis t1 of the first linear polarizer 210 is not exactly aligned with the +x direction, a slope function formula $\varnothing'_{sp}$ of $\varnothing_{sp}(\gamma)$ may be obtained by performing partial differential on Formula 13 with respect to $\gamma$, as shown in Formula 17 below:

$$\varnothing'_{sp} =$$

$$\frac{\begin{array}{l}-\sin(2\alpha+\theta)\cos(2\alpha-2\gamma+\theta)- \\ \cos\theta\sin(2\gamma-\theta)+\cos 2\alpha\end{array}}{\begin{array}{l}(\cos(2\gamma-\theta)-\sin(2\alpha+\theta))^2+ \\ (\sin(2\alpha-2\gamma+\theta)+\cos\theta)^2\end{array}} + \frac{\begin{array}{l}-\cos(2\alpha+\theta)\sin(2\alpha-2\gamma+\theta)+ \\ \sin\theta\cos(2\gamma-\theta)+\cos 2\alpha\end{array}}{\begin{array}{l}(\sin(2\gamma-\theta)+\cos(2\alpha+\theta))^2+ \\ (\cos(2\alpha-2\gamma+\theta)+\sin\theta)^2\end{array}} \qquad (17)$$

Figure 5:
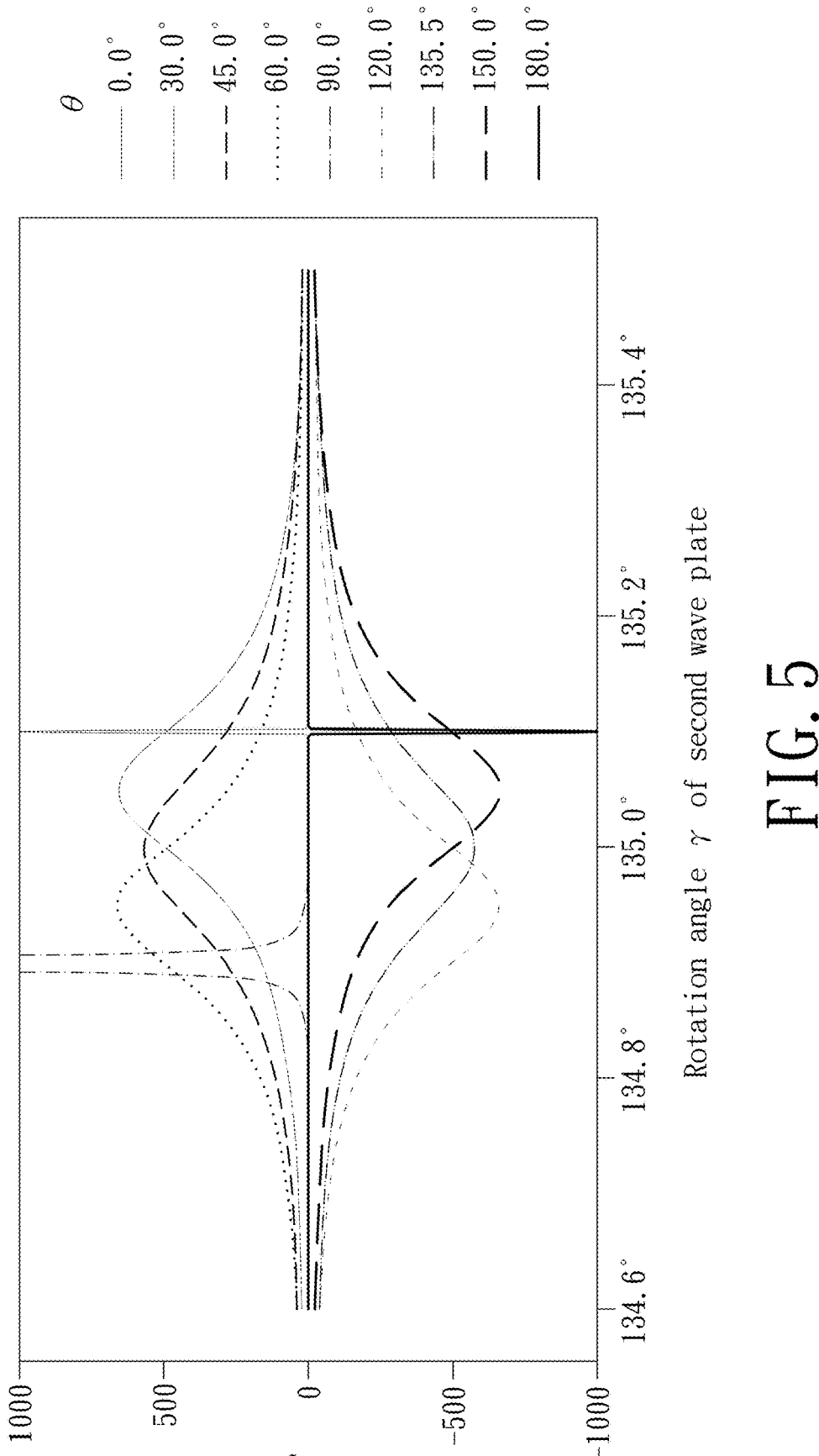
FIG. 5 is a schematic simulated diagram of a slope of a phase difference curve being affected by an angle $\theta$ when an error angle $\alpha$ is 0.1° according to an embodiment of the invention.
Figure 6:
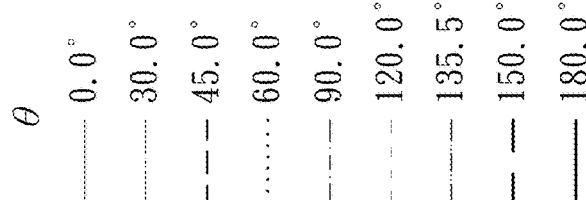
FIG. 6 is a schematic simulated diagram of a slope of a phase difference curve being affected by an angle $\theta$ when an error angle $\alpha$ is 0.2° according to an embodiment of the invention.
Figure 6:
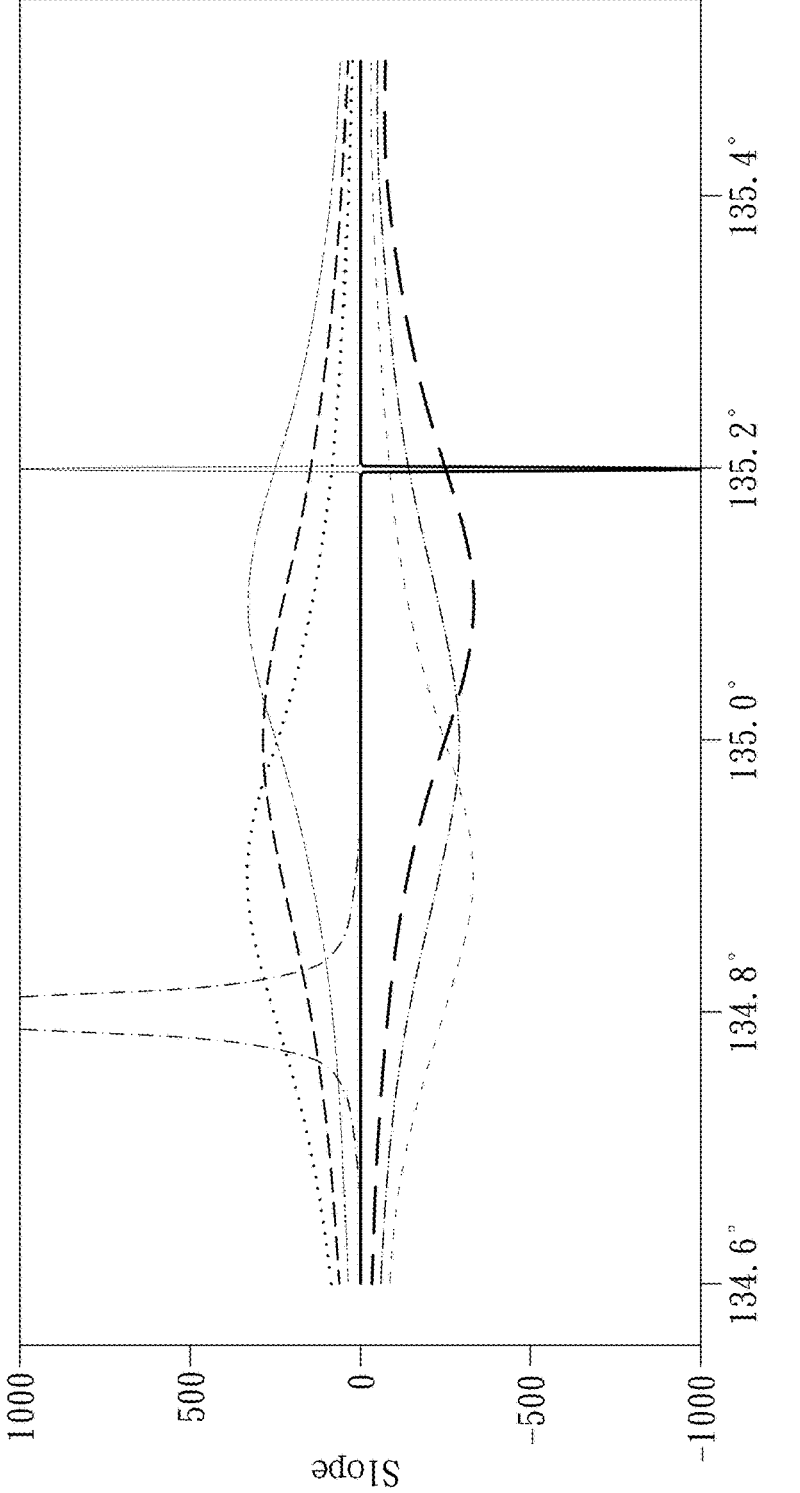

Then, the changing situation of the slope of the phase difference curve affected by the angle $\theta$ when the error angle is $0.1°$ and $0.2°$ is simulated through Python program. The angle $\theta$ is substituted into Formula 17 with $0°+e$, $30°$, $45°$, $60°$, $90°+e$, $120°$, $135°$, $150°$ and $180°+e$, respectively, where e is a minimum value near $0°$. The simulation results are shown in FIG. 5 and FIG. 6. FIG. 5 is a schematic simulated diagram of a slope of a phase difference curve being affected by an angle $\theta$ when an error angle $\alpha$ is $0.1°$ according to an embodiment of the invention. FIG. 6 is a schematic simulated diagram of a slope of a phase difference curve being affected by an angle $\theta$ when an error angle $\alpha$ is $0.2°$ according to an embodiment of the invention. Referring to FIG. 5 and FIG. 6, since the simulation results of the angle $\theta$ being $0°$, $30°$, $45°$ and $60°$ overlap the results of the angle $\theta$ being $180°$, $150°$, $135°$ and $120°$ respectively, the results of the angle $\theta$ being $180°$, $150°$, $135°$ and $120°$ are for example converted to negative numbers for viewing. In the figure, the angle $\theta$ affects the phase difference curve and the slope of the curve with a period of $180°$. The maximum slope value of the phase difference curve is highest at the angle $\theta$ of $0°$ as well as $180°$, and lowest at $45°$ as well as $135°$, and the rotation angle $\gamma_0$ of the second fast axis f2 corresponding to the maximum slope of the phase difference curve changes with the angle $\theta$ within the range of $135°\pm\alpha$.

Figure 7:
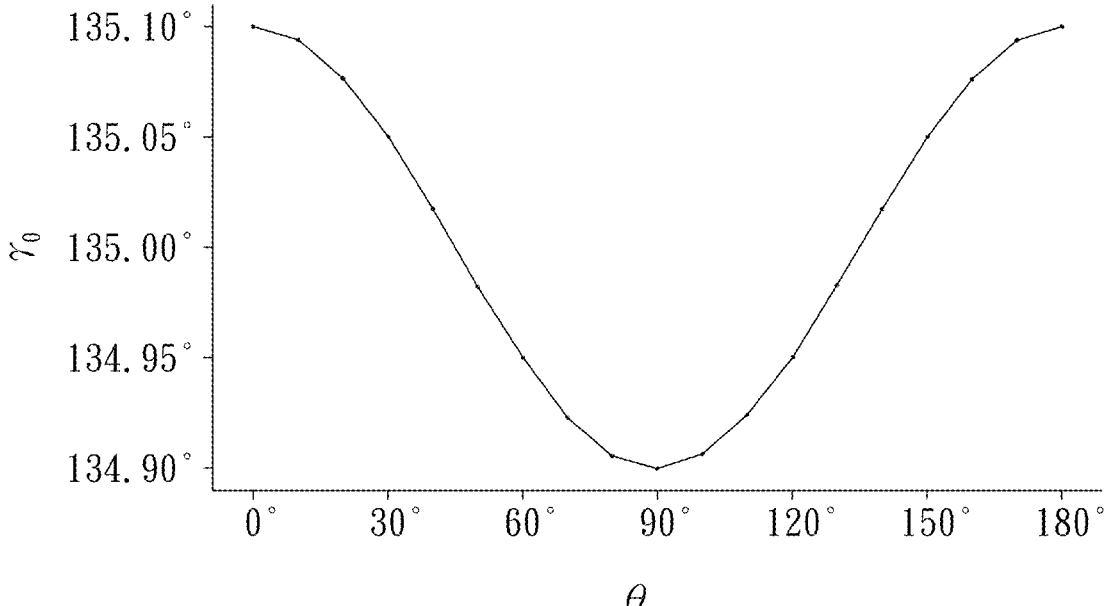
FIG. 7 is a schematic simulated diagram of a relationship between $\theta$ and a rotation angle $\gamma_0$ corresponding to a maximum slope of a phase difference curve when an error angle $\alpha$ is 0.1° according to an embodiment of the invention.

A relationship between the angle $\theta$ and the rotation angle $\gamma_0$ corresponding to a maximum slope of a phase difference curve when an error angle $\alpha$ is $0.1°$ is drawn as FIG. 7. Referring to FIG. 7, it can be seen that the relationship between the angle $\theta$ and the rotation angle $\gamma_0$ corresponding to the maximum slope of the phase difference curve has a trend of a sine wave, which oscillates between $135°+0.1°$ with $180°$ rotation of the angle $\theta$ as a period. According to the simulation results in FIG. 7, a relationship formula of $\alpha$, $\theta$ and $\gamma_0$ may be derived:

$$\gamma_0 = \alpha\cos 2\theta + \frac{3}{4}\pi \qquad (18)$$

Therefore, when the angle $\theta$ is for example not $0°$, the error angle $\alpha$ of the circular polarizer-to-be-detected 200 may also be calculated through Formula 18. Since the magnitude of the maximum slope value of the phase difference curve is related to the performance of the detection device in the embodiment, it can be seen from the simulation results in FIG. 4 to FIG. 6, the maximum slope value of the phase difference curve is maximum when the angle $\theta$ is $0°$ and minimum when the angle $\theta$ is $+45°$. Therefore, it can be judged that the detection device in the embodiment may achieve better detection performance when the angle $\theta$ is $0°$. That is, when the first transmission axis t1 is for example $0°$ and aligned with the +x direction, the circular polarizer detection device 100 has a relatively good detection effect.

In an embodiment, as shown in FIG. 1A, the circular polarizer detection device 100 for example further includes a motor 140 that is for example electrically connected to the second wave plate 120 and drives the second wave plate 120 to rotate. Specifically, the motor 140 may be a precise electrically controlled rotating device for controlling and adjusting the rotation angle $\gamma$ between the second fast axis f2 of the second wave plate 120 and the first transmission axis t1. In addition, the circular polarizer detection device 100 may further include a mounting base 150. The mounting base 150 is electrically connected to the motor 140. The second wave plate 120 is disposed on the mounting base 150. The motor 140 drives the mounting base 150 to rotate so as to adjust the rotation angle $\gamma$ of the second fast axis f2 of the second wave plate 120, and additionally, a current position of the mounting base 150 may be acquired through a program. That is, the rotation angle $\gamma$ of the second fast axis f2 of the second wave plate 120 being matched with the phase difference curve generated by the optical phase demodulation system is conducive to finding the rotation angle $\gamma_0$ of the second wave plate corresponding to the maximum slope of the phase difference curve, wherein an initial rotation angle $\gamma$ of the second fast axis f2 of the second wave plate 120 is for example 0°, but the invention is not limited thereto.

Stilling referring to FIG. 4, specifically, the optical phase demodulation system 130 of the circular polarizer detection device 100 according to an embodiment of the invention for example includes a third wave plate 131 and a photographing element 132. The third wave plate 131 is disposed between the second wave plate 120 and the photographing element 132. The photographing element 132 is for example a polarization camera (PLC), and the third wave plate 131 is for example a quarter-wave plate. The third wave plate 131 has a third fast axis f3. An included angle between the third fast axis f3 and the first transmission axis t1 of the first linear polarizer 210 is for example 45°. An included angle between the first transmission axis t1 and the +x direction is for example θ. At this time, an included angle between the third fast axis f3 and the +x direction is, for example, 45°+0. In the embodiment, for example, θ=0°. At this time, the included angle between the third fast axis f3 and the +x direction is, for example, 45°. Therefore, light intensity signal values of the photographing element 132 in four polarization directions may be the same, but it is not specifically limited in the invention.

In an embodiment, the optical phase demodulation system 130 for example simultaneously acquires light intensity values in four linear polarization directions of 0°, 45°, 90° and 135°. For instance, the photographing element 132 is for example provided with a photodiode and a plurality of polarizers forming a polarizer array, and the photodiode is disposed on a side of each polarizer away from the third wave plate 131. The polarizers in the array are arranged, for example, in a group of adjacent 2×2 matrices, and each group is composed, for example, of four linear polarizers of 0°, 45°, 90° and 135°, where 0° of the foregoing linear polarizer is, for example, in the +x direction. Therefore, for example, after passing through the third wave plate 131 and entering the photographing element 132, the second beam L2 will be firstly converted into for example four linearly polarized lights through the polarizer array and then received by the photodiode to obtain light intensity signals in the four polarization directions. Based on the characteristics of the foregoing photographing element 132, the light intensity signals in the four polarization directions of 0°, 45°, 90° and 135° may be simultaneously obtained in one image, which is conducive to greatly reducing the size of the optical phase demodulation system 130 and the number of the elements used. However, the optical phase demodulation system 130 is not specifically limited in the invention. In another embodiment, the optical phase demodulation system 130 may also divide the second beam L2 into a plurality of beams. Specifically, for example, three non-polarization beam splitters are used to divide the second beam L2 into four beams after passing through the third wave plate 131, and the beams respectively pass through the linear polarizers with angles of 0°, 45°, 90° and 135° included between their transmission axes and the +x direction, and then a photodetector receives the light intensity signals. Moreover, the photographing element 132 is not limited to the polarization camera. In another embodiment, the photographing element 132 may also be elements that may be used for acquiring light signals, such as the photodetector (PD) and a charge-coupled device (CCD).

Following the foregoing description, after the optical phase demodulation system 130 receives the second beam L2 and generates the phase difference curve, for example, the optical phase demodulation system 130 parses the rotation angle $\gamma_0$ corresponding to the maximum slope of the phase difference curve and calculates the error angle $\alpha$ through an operational formula, and the operational formula is $$\gamma_0 = \alpha + \frac{3}{4}\pi,$$

i.e., Formula 16, where the foregoing Formula 16 is derived from the angle θ of 0° between the first transmission axis t1 of the first linear polarizer 210 and the +x direction. The derivation process has been described previously and will not be described in detail.

Figure 8:
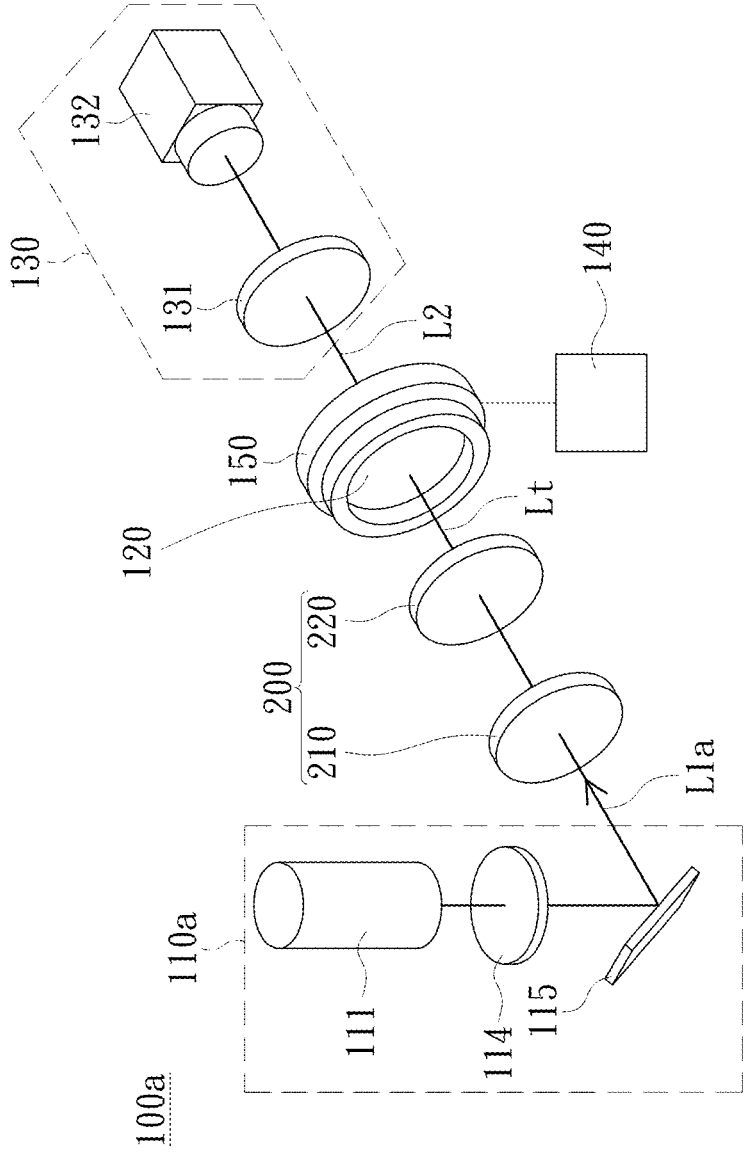
FIG. 8 is a schematic configuration diagram of a circular polarizer detection device according to another embodiment of the invention.

FIG. 8 is a schematic configuration diagram of a circular polarizer detection device according to another embodiment of the invention. The circular polarizer detection device 100a according to the embodiment shown in FIG. 8 mainly differs from the circular polarizer detection device 100 according to the embodiment shown in FIG. 1A in that the light source system 110a of the circular polarizer detection device 100a may not include the second linear polarizer 112 and the circular polarizer 113, where a first beam L1a may be in a non-circular polarization state, and may also be a non-polarization state. In addition, in yet another embodiment of the invention, the light source system 110 may use a non-laser light source.

Figure 9:
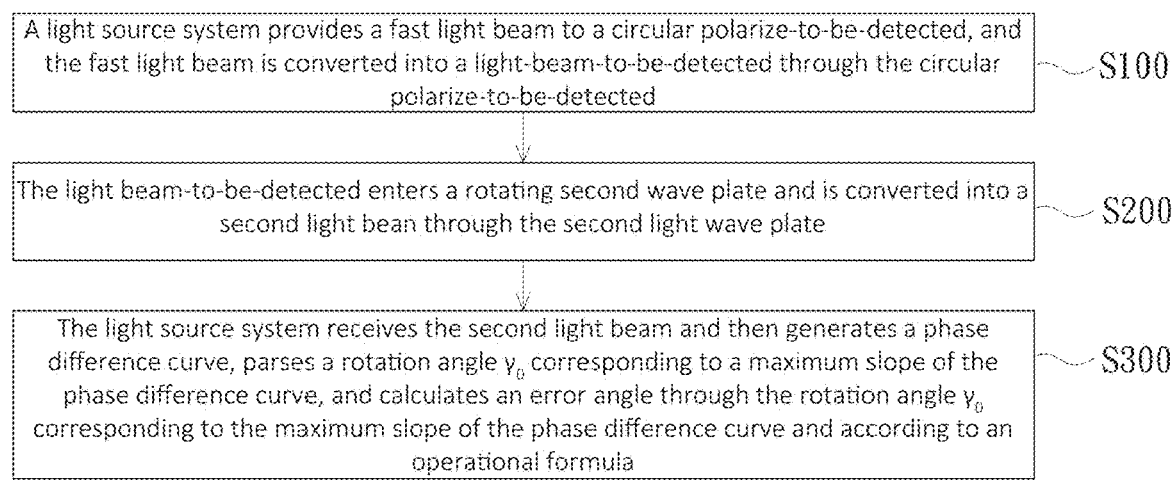
FIG. 9 is a schematic flow diagram of a circular polarizer detection method according to an embodiment of the invention.

FIG. 9 is a schematic flow diagram of a circular polarizer detection method according to an embodiment of the invention, which is applicable to detecting a circular polarizer-to-be-detected 200, and the structure of the circular polarizer-to-be-detected 200 has been disclosed in the embodiments shown in FIG. 1A and FIG. 1B. Simultaneously referring to FIG. 1A and FIG. 9, the circular polarizer detection method comprises providing a light source system 110, a second wave plate 120 and an optical phase demodulation system 130, where the structures and configuration relationships of the light source system 110, the second wave plate 120 and the optical phase demodulation system 130 have been disclosed in the embodiment shown in FIG. 1A, which will not be described in detail herein. The light source system 110 provides the first beam L1 to the circular polarizer-to-be-detected 200, and the first beam L1 is converted into a beam-to-be-detected Lt through the circular polarizer-to-be-detected 200, which is step S100; then, the beam-to-be-detected Lt enters the rotating second wave plate 120 and is converted into a second beam L2 through the second wave plate 120, which is step S200, where there is a variable rotation angle $\gamma$ between a second fast axis f2 and a first transmission axis t1 of a first linear polarizer 210, and the second beam L2 has a different phase difference as the rotation angle $\gamma$ varies; and then the optical phase demodulation system 130 receives the second beam L2 and then generates a phase difference curve, parses a rotation angle $\gamma_0$ corresponding to a maximum slope of the phase difference curve, and calculates an error angle through the rotation angle $\gamma_0$ corresponding to the maximum slope of the phase difference curve and according to an operational formula, which is step S300.

In an embodiment, the optical phase demodulation system 130 for example analyzes a light intensity signal of the second beam L2 to convert the same into the phase difference curve. Specifically, the optical phase demodulation system 130 divides the light intensity signal of the second beam L2 into light intensity signals at a plurality of linear polarization angles, the light intensity signals at the plurality of linear polarization angles are for example sequentially subjected to spatial filtering processing and low-pass filtering processing and then converted into the phase difference curve. For instance, there are e.g. four linear polarization angles, respectively 0°, 45°, 90° and 135° with respect to a +x direction. The following introduces how to convert the received light intensity signals into a phase difference. When the second beam L2 enters for example an electric field $E_0$ of a photodiode through the optical phase demodulation system 130, a Jones operational formula is:

$$E_0 = P(\beta)Q(45°)E_i = \begin{bmatrix} \cos^2\beta & \sin\beta\cos\beta \\ \sin\beta\cos\beta & \sin^2\beta \end{bmatrix} \begin{bmatrix} 1 & -i \\ -i & 1 \end{bmatrix} \begin{bmatrix} 1 \\ e^{i\delta} \end{bmatrix} = \tag{19}$$

$$e^{-i\beta}\left(1 + e^{i(\delta+2\beta-\frac{\pi}{2})}\right)\begin{bmatrix} \cos\beta \\ \sin\beta \end{bmatrix}$$

Where $P(\beta)$ is a Jones matrix of linear polarizers, $\beta$ is included angles between transmission axes of polarizers and the +X direction, $Q(45°)$ is a Jones matrix of a third wave plate 131, with an angle of 45° being included between a third fast axis f3 and the +x direction, and $\delta$ is a phase difference between two components entering a photoelectric field $E_i$. Since signals received by the photodiode and other light signal acquisition tools are light intensity signals, it can be seen from a light intensity being directly proportional to the square of an absolute value of the electric field that the light intensity received by the photodiode is:

$$I = |E_0|^2 = E_0 \cdot E_0* = 1 + \sin(2\beta + \delta) \tag{20}$$

Where $E_0*$ is a conjugate complex number of $E_0$. For example, if the included angles $\beta$ between the transmission axes of the four polarizers and the +x direction are set to be 0°, 45°, 90° and 135° respectively, after being subjected to trigonometric function conversion, the light intensity signals received by the photodiode are respectively:

$$I_0 = 1 + \sin\delta \tag{21}$$

$$I_{90} = 1 - \sin\delta \tag{22}$$

$$I_{45} = 1 + \cos\delta \tag{23}$$

$$I_{135} = 1 - \cos\delta \tag{24}$$

$I_0$ and $I_{90}$ as well as $I_{45}$ and $I_{135}$ are subtracted in pairs to eliminate constant terms, and then two difference values after subtracting are subjected to arc tangent operation to obtain the phase difference $\delta$:

$$\delta = \tan^{-1}\left(\frac{I_0 - I_{90}}{I_{45} - I_{135}}\right) \tag{25}$$

Figure 10:
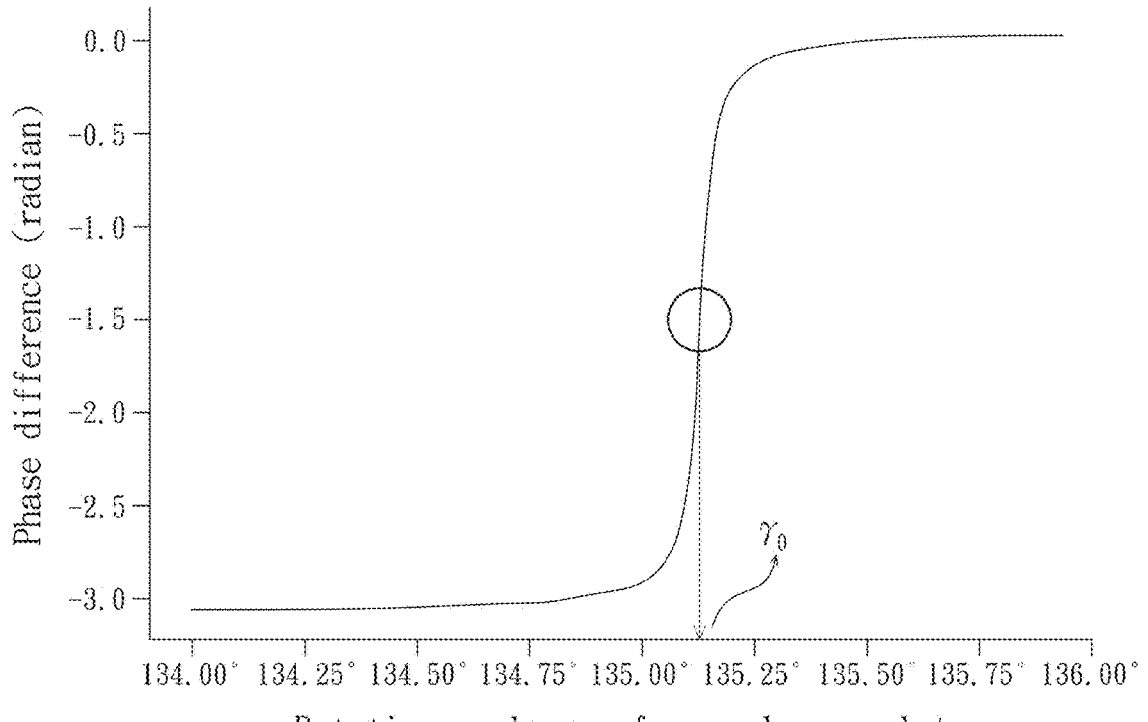
FIG. 10 is a schematic diagram of a phase difference and a rotation angle $\gamma$ of a second fast axis of a second wave plate according to an embodiment of the invention.

FIG. 10 is a schematic diagram of a phase difference and a rotation angle $\gamma$ of a second fast axis of a second wave plate according to an embodiment of the invention. In order to reduce noise, the circular polarizer detection method filters the light intensity signals, for example, in a spatial domain. Specifically, for example, firstly, in a state where the mounting base 150 and the second wave plate 120 (as shown in FIG. 1A) are stationary and do not rotate, the polarization camera acquires light intensities at different image sizes respectively and uses an average light intensity value of the whole image as an instantaneous light intensity value, which is used, for example, as a background value of the light intensities. Therefore, a light intensity value obtained after rotating of the second wave plate 120 may be compared with the foregoing background value, that is, light noise in space is removed, which is conducive to reducing interference of the phase difference curve. Then, the mounting base 150 and the second wave plate 120 are rotated. After obtaining four light intensity curves within a rotation time of the second wave plate 120, the optical phase demodulation system 130 for example performs low-pass filtering on the light intensity signals in a time domain, which further reduces noise to smoothly obtain the slope of the phase difference curve. Since the light intensity signals subjected to low-pass filtering will be distorted at a tail and end of data, and the lower a frequency of low-pass filtering is, the longer a distorted segment of data is, the low-pass filtering frequency needs to be adjusted according to current electronic noise of an experiment, and at the same time, the distorted data cannot be covered by a data segment in the change of the phase difference curve. A position of the maximum slope of the phase difference curve and the rotation angle $\gamma_0$ of the second fast axis f2 of the second wave plate 120 corresponding thereto can be easily distinguished by using the phase difference curve calculated by the light intensities subjected to low-pass filtering. As such, the electronic noise of the light intensities may be reduced by subjecting the light intensity signals to spatial filtering and low-pass filtering processing, and then the light intensity signals are converted into the phase difference curve, which is conducive to distinguishing the rotation angle $\gamma_0$ corresponding to the maximum slope of the phase difference curve.

It is worth mentioning that the circular polarizer detection device 100 and the circular polarizer detection method according to the embodiments of the invention utilize the characteristic that a phase difference dramatically changes when two quarter-wave plates are rotated to a specific angle, and the error angle $\alpha$ of the circular polarizer-to-be-detected 200 may be calculated through an operational formula, Formula 16, by finding the rotation angle $\gamma_0$ of the second fast axis f2 of the second wave plate 120 corresponding to the maximum slope value of the phase difference curve, so the polarization state of the incident light may not be controlled, which is conducive to reducing usage limitation of the light source system 110. Moreover, since the phase difference has the characteristic of dramatically changing, it is easier to accurately measure the rotation angle $\gamma_0$ of the second fast axis f2 of the second wave plate 120 corresponding to the maximum slope of the phase difference curve, and thus a more accurate error angle $\alpha$ is obtained. For instance, the embodiment may distinguish the minimum change amount of the error angle $\alpha$ of 0.03°, that is, the resolution of the embodiment may reach 0.03°.

The circular polarizer detection device and the circular polarizer detection method according to the embodiments of the invention adopt the second wave plate suitable for rotating to change a phase difference of light-to-be-detected exiting from the circular polarizer-to-be-detected, and thus can accurately detect the circular polarizer.

Although the invention has been disclosed as above with embodiments, it is not intended to limit the invention, and a person skilled in the technical field to which the invention belongs may make some changes and modifications without departing from the spirit and scope of the invention. Therefore, the scope of protection of the invention shall be defined in the appended claims.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A circular polarizer detection device, applicable to detecting a circular polarizer-to-be-detected, the circular polarizer-to-be-detected comprising a first linear polarizer and a first wave plate, the first wave plate being disposed on a side of the first linear polarizer, the first linear polarizer having a first transmission axis, the first wave plate having a first fast axis, there being a preset angle and an error angle between the first transmission axis and the first fast axis, and the circular polarizer detection device comprising:

a light source system, disposed on a side of the circular polarizer-to-be-detected, wherein the first linear polarizer is between the light source system and the first wave plate, the light source system provides a first beam to the circular polarizer-to-be-detected, and the first beam is converted into a beam-to-be-detected through the circular polarizer-to-be-detected;

a second wave plate, disposed on a side of the circular polarizer-to-be-detected away from the light source system, wherein the second wave plate is suitable for rotating, the beam-to-be-detected enters the rotating second wave plate and is converted into a second beam through the second wave plate, the second wave plate has a second fast axis, there is a variable rotation angle $\gamma$ between the second fast axis and the first transmission axis of the first linear polarizer, and the second beam has a different phase difference as the rotation angle $\gamma$ varies; and an optical phase demodulation system, disposed on a side of the second wave plate away from the circular polarizer-to-be-detected, wherein the optical phase demodulation system receives the second beam, generates a phase difference curve, and analyzes a relationship between the rotation angle $\gamma$ and the error angle through the phase difference curve.

2. The circular polarizer detection device according to claim 1, wherein the second wave plate is a quarter-wave plate.

3. The circular polarizer detection device according to claim 2, further comprising a motor, electrically connected to the second wave plate and driving the second wave plate to rotate.

4. The circular polarizer detection device according to claim 1, wherein the preset angle is 45 degrees.

5. The circular polarizer detection device according to claim 1, wherein the optical phase demodulation system comprises a third wave plate and a photographing element, and the third wave plate is disposed between the second wave plate and the photographing element.

6. The circular polarizer detection device according to claim 5, wherein the photographing element is a polarization camera.

7. The circular polarizer detection device according to claim 5, wherein the third wave plate is a quarter-wave plate.

8. The circular polarizer detection device according to claim 5, wherein the third wave plate has a third fast axis, and an included angle between the third fast axis and the first transmission axis of the first linear polarizer is 45 degrees.

9. The circular polarizer detection device according to claim 1, wherein the light source system comprises a laser light source, a second linear polarizer, and a circular polarizer, the second linear polarizer is disposed between the laser light source and the circular polarizer, and the laser light source provides a laser beam to sequentially pass through the second linear polarizer and the circular polarizer to form the first beam.

10. The circular polarizer detection device according to claim 9, wherein the first beam is a circularly polarized light.

11. The circular polarizer detection device according to claim 1, wherein the optical phase demodulation system parses the rotation angle $\gamma_0$ corresponding to a maximum slope of the phase difference curve and calculates the error angle $\alpha$ through an operational formula, and the operational formula is $$\gamma_0 = \alpha + \frac{3}{4}\pi.$$

12. A circular polarizer detection method, applicable to detecting a circular polarizer-to-be-detected, the circular polarizer-to-be-detected comprising a first linear polarizer and a first wave plate, the first wave plate being disposed on a side of the first linear polarizer, the first linear polarizer having a first transmission axis, the first wave plate having a first fast axis, there being a preset angle and an error angle between the first transmission axis and the first fast axis, and the circular polarizer detection method comprising:

providing a light source system, disposed on a side of the circular polarizer-to-be-detected, wherein the first linear polarizer is between the light source system and the first wave plate, the light source system provides a first beam to the circular polarizer-to-be-detected, and the first beam is converted into a beam-to-be-detected through the circular polarizer-to-be-detected;

disposing a second wave plate on a side of the circular polarizer-to-be-detected away from the light source system, wherein the second wave plate is suitable for rotating, the beam-to-be-detected enters the rotating second wave plate and is converted into a second beam through the second wave plate, the second wave plate has a second fast axis, there is a variable rotation angle $\gamma$ between the second fast axis and the first transmission axis of the first linear polarizer, and the second beam has a different phase difference as the rotation angle $\gamma$ varies; and disposing an optical phase demodulation system on a side of the second wave plate away from the circular polarizer-to-be-detected to receive the second beam and generate a phase difference curve, the optical phase demodulation system parsing the rotation angle $\gamma_0$ corresponding to a maximum slope of the phase difference curve and calculating the error angle through the rotation angle $\gamma_0$ corresponding to the maximum slope of the phase difference curve and according to an operational formula.

13. The circular polarizer detection method according to claim 12, wherein the operational formula for calculating the rotation angle $\gamma_0$ corresponding to the maximum slope of the phase difference curve and the error angle $\alpha$ is $$\gamma_0 = \alpha + \frac{3}{4}\pi.$$

14. The circular polarizer detection method according to claim 12, wherein the optical phase demodulation system analyzes a light intensity signal of the second beam to convert same into the phase difference curve.

15. The circular polarizer detection method according to claim 14, wherein the optical phase demodulation system divides the light intensity signal of the second beam into light intensity signals at a plurality of linear polarization angles, the light intensity signals at the linear polarization angles are sequentially subjected to spatial filtering processing and low-pass filtering processing and then converted into the phase difference curve.

16. The circular polarizer detection method according to claim 15, wherein the optical phase demodulation system comprises a third wave plate and a photographing element, and the third wave plate is disposed between the second wave plate and the photographing element.

17. The circular polarizer detection method according to claim 16, wherein the photographing element is a polarization camera.

\* \* \* \* \*